United States Patent
Chaffins et al.

(10) Patent No.: US 9,068,096 B2
(45) Date of Patent: Jun. 30, 2015

(54) PERFLUOROPOLYETHERS AS INK ADDITIVES

(75) Inventors: Sterling Chaffins, Albany, OR (US); Kevin P. DeKam, Albany, OR (US); Jayprakash C Bhatt, Corvallis, OR (US); Mehrgan Khavari, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/232,800

(22) PCT Filed: Jul. 28, 2011

(86) PCT No.: PCT/US2011/045669
§ 371 (c)(1),
(2), (4) Date: Jan. 14, 2014

(87) PCT Pub. No.: WO2013/015813
PCT Pub. Date: Jan. 31, 2013

(65) Prior Publication Data
US 2014/0137766 A1    May 22, 2014

(51) Int. Cl.
*C09D 11/38* (2014.01)
*C09D 11/10* (2014.01)

(52) U.S. Cl.
CPC ........... *C09D 11/38* (2013.01); *C09D 11/10* (2013.01)

(58) Field of Classification Search
CPC ................................ C09D 11/10; C09D 11/38
USPC .......................................... 106/31.59, 31.89
See application file for complete search history.

(56) References Cited

U.S. PATENT DOCUMENTS

| 3,948,668 | A |   | 4/1976 | Hayek et al. |
| 5,401,303 | A | * | 3/1995 | Stoffel et al. ............... 106/31.58 |

(Continued)

FOREIGN PATENT DOCUMENTS

| EP | 0974626 | 1/2000 |
| EP | 1275511 | 1/2003 |

(Continued)

OTHER PUBLICATIONS

English translation of JP 2009/242723; Oct. 2009.*

(Continued)

*Primary Examiner* — Helene Klemanski
(74) *Attorney, Agent, or Firm* — Hewlett-Packard Patent Department

(57) ABSTRACT

An ink is disclosed. The ink composition includes an ink vehicle, a colorant, and a fluorosurfactant, wherein the fluorosurfactant is a polymer having the general formula:

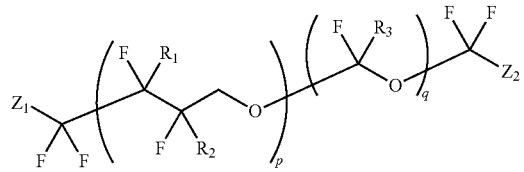

wherein p is any integer, q is any integer, $Z_1$ and $Z_2$ are each fluorine or any functional group, and $R_1$, $R_2$, $R_3$ are each fluorine, any alkyl group, or any functional group, and wherein $R_1$, $R_2$, $R_3$, $Z_1$, and $Z_2$ are not all fluorine and the fluorosurfactant lowers the surface tension of the ink vehicle. A method for improving a property of an ink is also disclosed.

15 Claims, 4 Drawing Sheets

(56) References Cited

U.S. PATENT DOCUMENTS

| | | |
|---|---|---|
| 5,824,461 A | 10/1998 | Schell |
| 5,919,293 A | 7/1999 | Moffatt |
| 6,087,416 A | 7/2000 | Pearlstine et al. |
| 6,436,180 B1 | 8/2002 | Ma et al. |
| 6,726,756 B1* | 4/2004 | Zou et al. .................. 106/31.58 |
| 7,666,940 B2 | 2/2010 | Iengo |
| 2003/0144465 A1 | 7/2003 | Leenders et al. |
| 2005/0261389 A1 | 11/2005 | Bratolavsky |
| 2007/0120928 A1 | 5/2007 | Ma et al. |
| 2010/0302326 A1 | 12/2010 | Morohoshi et al. |
| 2011/0012954 A1* | 1/2011 | Brown et al. .................. 347/20 |
| 2013/0327247 A1* | 12/2013 | Khavari .................. 106/31.43 |

FOREIGN PATENT DOCUMENTS

| | | |
|---|---|---|
| JP | 11-323228 | 11/1999 |
| JP | 2004018394 | 1/2004 |
| JP | 2004534900 | 11/2004 |
| JP | 2006298948 | 11/2006 |
| JP | 2007099860 | 4/2007 |
| JP | 2009/242723 | * 10/2009 |
| JP | 2009242723 | 10/2009 |
| JP | 2010-270267 | 12/2010 |
| WO | 0194480 | 12/2001 |
| WO | 03006563 | 1/2003 |
| WO | 2012121700 | 9/2012 |

OTHER PUBLICATIONS

English translation of JP 2010/189490; Sep. 2010.*
International Search Report and Written Opinion, Korean IPO, Apr. 6, 2012, Hewlett-Packard Development Company, L.P., PCT Application No. PCT/US11/45669.
Extended European Search Report dated Sep. 3, 2014, Applicant Hewlett Packard Development Company, L.P., Application No./Patent No. 118701144.3-1302/2736983 PCT/US2011045669.

* cited by examiner

Figure 3

PERFLUOROPOLYETHERS AS INK ADDITIVES

BACKGROUND

Inkjet printing systems are commonly used as an effective way of producing images on a print medium, such as paper or other organic or inorganic substrates. In one example, ink droplets, which may be formed from one or more inks, are ejected from a nozzle or other drop generating device, (e.g. printhead) at a high speed onto the print medium to produce an image. The image produced may include, but are not limited to, photos, graphics, texts, characters, symbols or combinations thereof.

Inkjet inks or aqueous inks may be dye-based or pigment-based and are evaluated based upon certain properties such as color, jettability, drying time, stability during long term storage, decap properties (i.e. the amount of time a printhead can be left uncapped and idle, and afterwards, still eject or fire ink droplets properly), ability to produce high quality images, wetting properties, among other properties.

DETAILED DESCRIPTION

Reference is now made in detail to specific examples of the disclosed ink. When applicable, alternative examples are also briefly described.

It is noted that, as used in this specification and the appended claims, the singular forms "a," "an," and "the" include plural referents unless the context clearly dictates otherwise.

As used herein, "about" means a ±10% variance caused by, for example, variations in manufacturing processes.

As used herein, the term "long-chain" refers to molecules including one or more perfluorinated carbon chains, wherein each carbon chain includes more than four perfluorinated carbons in a row.

As used herein, the term "short-chain" refers to molecules including one or more perfluorinated carbon chains, wherein each carbon chain includes four or less perfluorinated carbons in a row.

Fluorosurfactants are common additives used in aqueous inks to control puddling on the print head or to improve ink on media interactions, such as minimization of bleeding, feathering, mottling, dot gain, smearing, etc. of images printed on a media substrate. Particularly, in the past, fluorosurfactants including long chains of perfluorinated carbons have been used. However, in December 2009, the United States Environmental Protection Agency (EPA) released an Action Plan detailing the significant adverse effects of long-chain perfluorinated chemicals (PFC) and announced its intention to address the risks presented by these long-chain PFCs using its rulemaking power under the Toxic Substances Control Act.

A new composition for aqueous inks is disclosed, including perfluoropolyethers (PFPE). PFPEs are short-chain PFCs that may be significantly less toxic than long-chain PFCs and may be capable of improving the quality of ink. PFPEs include, at longest, a two carbon chain, which is shorter than the carbon chains in commonly used fluorosurfactants and shorter than the EPA's characterization of long-chain PFCs (i.e. more than four fluorinated carbons in a row). Additionally, the use of PFPEs in aqueous inks may result in inks with improved decap, wetting and/or jettability properties.

In general, PFPEs are a class of polymers with a backbone including fluorinated methylene oxide and ethylene oxide repeat units. The integration of oxygen into the backbone of these materials may allow them to be significantly less toxic than non-oxygenated perfluorinated carbon chains, such as long chain PFCs. Additionally, PFPEs may be functionalized such that they can be used as additives in inks in order to improve the quality of the inks.

In general, PFPEs may have a number of characteristics that may make them particularly suitable for use as additives in aqueous inks. For example, as further discussed below, PFPEs may be good surfactants because they have a low carbon to fluorine ratio. Accordingly, like their long-chain fluorosurfactant counterparts, in aqueous inks, PFPEs may rise to the liquid-air interface to form a liquid cap in the orifice bore. The formation of the liquid cap may reduce evaporation of the ink, which may in turn, improve decap time. In other words, formation of the liquid cap may increase the time a printhead can be left uncapped before its performance is negatively affected due to drying out of the ink. The inclusion of PFPEs in aqueous ink may also help to reduce ink puddling, wicking or spread on organic or inorganic printhead surfaces, which may cause droplet misdirection, another condition that negatively affects a printhead's decap time. Additionally, also like their long-chain fluorosurfactant counterparts and as further described above, PFPEs may improve ink on media interactions, such as bleeding, feathering, mottling, etc.

Finally, in aqueous inks, PFPEs may be non-reactive, may not alter the viscosity of the ink, and may remain in a liquid state. Also, when inks including PFPEs are used in printing processes, the PFPEs may remain amorphous such that when the ink dries, the PFPEs do not form crystallites.

An example general structure for a functionalized PFPE may be:

wherein p and q may each be any integer and in some examples, the ratio of p:q may be between 1:1 and 1:2; $Z_1$ and $Z_2$ may each be fluorine or any functional group; and $R_1$, $R_2$, $R_3$ may each be fluorine, any alkyl group or any functional group, provided that if $R_1$, $R_2$, and $R_3$ are all fluorine, $Z_1$ and $Z_2$ are not both fluorine and provided that, in aqueous solution, the functionalized PFPE lowers the surface tension of such aqueous solution.

In some examples, as discussed above, $R_1$, $R_2$, and $R_3$ may be any alkyl group, such as linear, branched or hyper-branched alkyls. Examples of such groups may include, but are not limited to, methyl, ethyl, propyl, isopropyl, butyl, iso-butyl, n-octyl, n-decyl, n-dodecyl or n-tetradecyl groups. As used herein, "hyper-branched polymers" means densely branched, dendritic polymers having repeating units that start from a central backbone.

In some examples, $R_1$, $R_2$, $R_3$ are all the same, while in other examples, at least one of $R_1$, $R_2$ or $R_3$ is different from the other R groups. Additionally, in some examples, an alkyl $R_1$, alkyl $R_2$ or alkyl $R_3$ may further include one or more additional functional groups having the same characteristics as the Z groups, as described above.

In some examples, $Z_1$, $Z_2$, $R_1$, $R_2$, $R_3$, and any additional functional groups on an alkyl $R_1$, alkyl $R_2$ or alkyl $R_3$ may all be the same. In other examples, $Z_1$, $Z_2$, $R_1$, $R_2$, $R_3$, and any additional functional groups on an alkyl $R_1$, alkyl $R_2$ or alkyl $R_3$ may not all be the same. In yet other examples, $Z_1$, $Z_2$, $R_1$, $R_2$, $R_3$, and any additional functional groups on an alkyl $R_1$, alkyl $R_2$ or alkyl $R_3$ may all be different.

As discussed previously, $Z_1$, $Z_2$, $R_1$, $R_2$, $R_3$ or any additional functional group on an alkyl $R_1$, alkyl $R_2$ or alkyl $R_3$ may be any functional group, provided that, in aqueous solution, the functionalized PFPE lowers the surface tension of such aqueous solution. Surface tension measures the degree to which a liquid can resist an external force. In general, surface tension in aqueous solutions is driven by hydrogen bonding found at the interface of the aqueous solution and another liquid or gas. Surfactants, such as PFPEs, lower surface tension in aqueous solutions because it is energetically favorable for them to diffuse to the interface between the aqueous solution and another liquid or gas. At this interface, hydrogen bonding may be broken up by the hydrophobic portions of the surfactants seeking a non-aqueous environment, resulting in the aqueous solution having a lower surface tension.

Some examples of suitable functional groups may include, but are not limited to, acrylates, alcohols, amides, amines, carbamates, carboxylates, epoxies, esters, ethers, guanidiniums, imines, ketones, oximes, phosphates, phosphonates, protonated nitrogens, silanes, sulfates or sulfonamides. In some examples, the suitable functional group may be an alcohol. In one example, the suitable functional group may be a hydroxymethyl group. In other examples, other alcohol derivatives may be used.

In some examples, the PFPE may be a linear polymer with a general formula as seen below, in which $R_1$, $R_2$, and $R_3$ are all fluorine:

wherein p and q may each be any integer and in some examples, the ratio of p:q may be between 1:1 and 1:2. In some examples, either $Z_1$ or $Z_2$ or both $Z_1$ or $Z_2$ may be a carboxylate. If used in basic aqueous inks, a carboxylate group on the PFPE, which has a pKa less than 5, may become deprotonated in the aqueous ink and may assist in solubilizing the remaining perfluorinated structure. In other examples, as described above, other functional groups that may assist in solubilizing the perfluorinated structure may be used.

When PFPEs are used as additives in aqueous inks, an example ink formulation may include a functionalized PFPE, an ink vehicle, and a colorant. Additionally, in some examples, as further discussed below, the ink formulation may further include other additives. In some examples, the functionalized PFPE may make up between 0 wt % and 2 wt % of the ink.

The ink vehicle used in aqueous inks may include water and one or more organic solvents or combinations thereof. In some examples, water makes up between 60 wt % to 99.9 wt % of the ink and the one or more organic solvents make up between 0 wt % to 40 wt % of the ink.

In some examples, suitable water-soluble organic solvents may include, but are not limited to, glycerols, glycols, alcohols, diols, amines, ethers, amides or combinations thereof. Non-limiting specific examples of such suitable solvents may include 1,2-hexanediol, 1,5-pentanediol, 1,3,5-(2-methyl)-pentanetriol, 1,6-hexanediol, 2-methyl-1,3-propanediol, 1,2-alkyldiol, ethylhydroxy-propanediol, 1,2-propanediol, 2-hydroxyethyl-2-pyrrolidone, 2-pyrrolidone, n-methylpyrrolidone, 1-(2-hydroxy ethyl)-2-pyrrolidone, diethylene glycol, dipropylene glycol, propylene glycol, liponic ethylene glycol-1, diethyleneglycol, tetraethylene glycol, n-butyl ether, tri(propyleneglycol) methyl ether, glycerol, n,n-di-(2-hydroxyethyl)-4,4-dimethylhydantoin, 3-pyridyl carbinol, 3-methyl-1-butanol, pentaerythritol, 2-hydroxyethyl-2-imidazole, tetramethylene sulfone, sulfolane or combinations thereof.

The colorant used in the ink may be organic or inorganic and may be a colored dye, a colored pigment that has been surface modified to form a stable aqueous dispersion or a combination thereof, in any possible color, such as RGB or CYMK. In some examples, the colorant may be between 0 wt % and 20 wt % of the ink.

In some examples, the colorant may be selected from black dyes, yellow dyes, magenta dyes, red dyes, violet dyes, cyan dyes, blue dyes, green dyes, orange dyes, brown dyes, white dyes or combinations thereof. The dye may be a single dye or a combination of dyes. In one example, a green dye may be formed by mixing a yellow dye and a blue dye. The solvent composition in the ink vehicle may also be selected to create the desired solubility for a particular dye or combination of dyes.

The lists of dyes below are described using their Color Index (C.I.) Generic Names. These lists are given only as examples and are not intended to be comprehensive. A number of other dyes or combinations of dyes may also be used. Black dyes may include C.I. Solvent Black 5, 7, 27, 28, 29, 34, 35, 45, 46 or 48. Blue dyes may include C.I. Solvent Blue 4, 5, 6, 35, 38, 48, 59, 67, 70, 104 or 136. Violet dyes may include C.I. Solvent Violet 8, 9, 11, 14 or 38. Brown dyes may include C.I. Solvent Brown 1, 3, 5, 20, 42, 43, 44, 48 or 52. Orange dyes may include C.I. Solvent Orange 3, 11, 20, 25, 54, 60, 62, 63, 86, 99 or 105. Red dyes may include C.I. Solvent Red 1, 23, 29, 49, 119, 122, 125, 127, 130, 132, 135, 149, 160, 164, 168, 169, 172 or 233. Yellow dyes may include C.I. Solvent Yellow 10, 13, 14, 19, 25, 28, 33, 88, 89, 114, 146 or 163. As discussed above, dyes may be used in a wide variety of combinations. In one example, C.I. Solvent Blue 70 and C.I. Red 233 or Solvent Violet 9 and Solvent Brown 52 may be used in combination.

As previously discussed, colored pigments that have been surface modified to form a stable aqueous dispersion may also be used in aqueous inks as colorants. Non-limiting examples of such colored pigments may include, but are not limited to, magenta pigments such as PR122 or PR269, yellow pigments such as PY74, PY17 or PY174, or cyan pigments such as PB15:1, PB15:2 or PB15:3.

Finally, in some examples, the ink vehicle may further include other additives, such as anti-curl agents, buffers, binders, biocides, corrosion inhibitors, dispersants, humectants, light stabilizers, nanoparticle stabilizers, optical brighteners, pH adjusting agents, polymers, rheology modifiers, sequestering agents, stabilizers, surfactants, thickeners, viscosity modifiers, surface-active agents or combinations thereof. Such additives may serve to enhance print performance, improve the reliability of the printhead, improve the quality of images printed on media substrate or otherwise improve the quality of the ink or use of the ink. In some examples, such other additives may be between 0 wt % to 10 wt % of the ink.

As briefly discussed above, in addition to being significantly less toxic than their long-chain fluorosurfactant counterparts, inks including PFPE additives may perform better than inks without any PFPE additives or any other fluorosurfactant additives. In particular, PFPE additives may improve one or more properties of inks, such as decap properties, puddling properties, wettability properties or jettability properties. Additionally, also as discussed above, ink on media interactions may be improved when the ink includes PFPEs. In particular, there may be decreased droplet penetration and decreased bleed of ink on media.

Aqueous inks including PFPE additives may have better decap properties. Decap properties describe the speed at which an ink recovers after an ink cartridge containing the ink has been left uncapped and idle for a certain amount of time. Inks with good decap properties may show less puddling when used in printing processes.

Figure 1A:
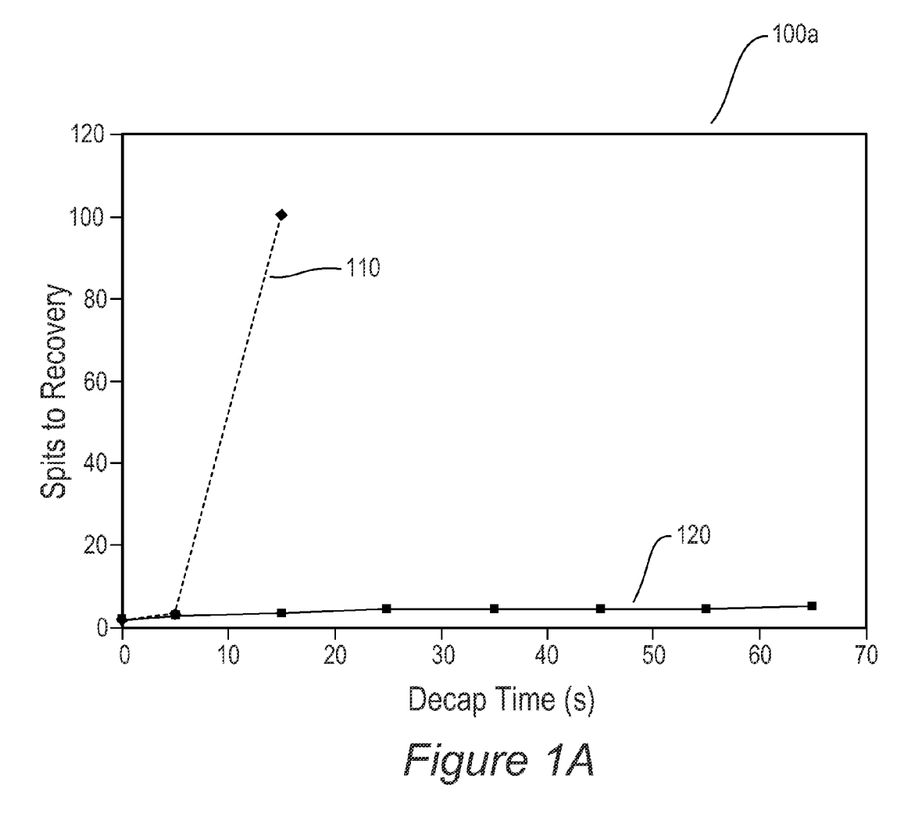
FIG. 1A, on coordinates of spits to recovery (number of resistor firings before proper droplet ejection occurs and the printhead's performance is restored) and decap time (in seconds), is a graph comparing the recovery of inks including and not including polyfluoropolyether (PFPE) and using a known ineffective decapping solvent.

FIG. 1A, on coordinates of spits to recovery (number of resistor firings before proper droplet ejection occurs and the printhead's performance is restored) and decap time (s), is a graph 100a comparing the recovery of inks including and not including PFPE and using a known ineffective decapping solvent. In this comparison, first, two print cartridges were loaded with ink including a 1,2-hexanediol based solvent, wherein 1,2-hexanediol is known to be a poor decapping solvent. In one cartridge, the ink further included 0.5 wt % of dicarboxylate terminated PFPE. Next, the cartridges were left uncapped and idle for set amounts of time. Uncapping of the printhead may cause phase separation in the ink, which may result in the formation of a viscous plug at the nozzle. Finally, after the printhead was left uncapped for a certain amount of time, the number of spits it took for the printhead to fire a drop of ink properly was measured. As used herein, "spits" means the firing of a drop of ink by the printhead onto print media or a waste container.

In FIG. 1A, the plotline 120 represents the number of spits before recovery by the printhead loaded with ink including 0.5 wt % of dicarboxylate terminated PFPE. On the other hand, the plotline 110 represents the number of spits before recovery by a printhead not including PFPE. As seen in the plotline 110, the printhead loaded with ink not including PFPE took over 100 spits to recover after a 15 second decap time and did not recover for decap times longer than 15 seconds. On the other hand, as seen in the plotline 120, the printhead loaded with ink including PFPE recovered after a minimum number of spits even after a decap time of over 60 seconds. Therefore, the inclusion of PFPE in inks including poor decapping solvents may result in significantly improved inks with good decap properties.

Figure 1B:
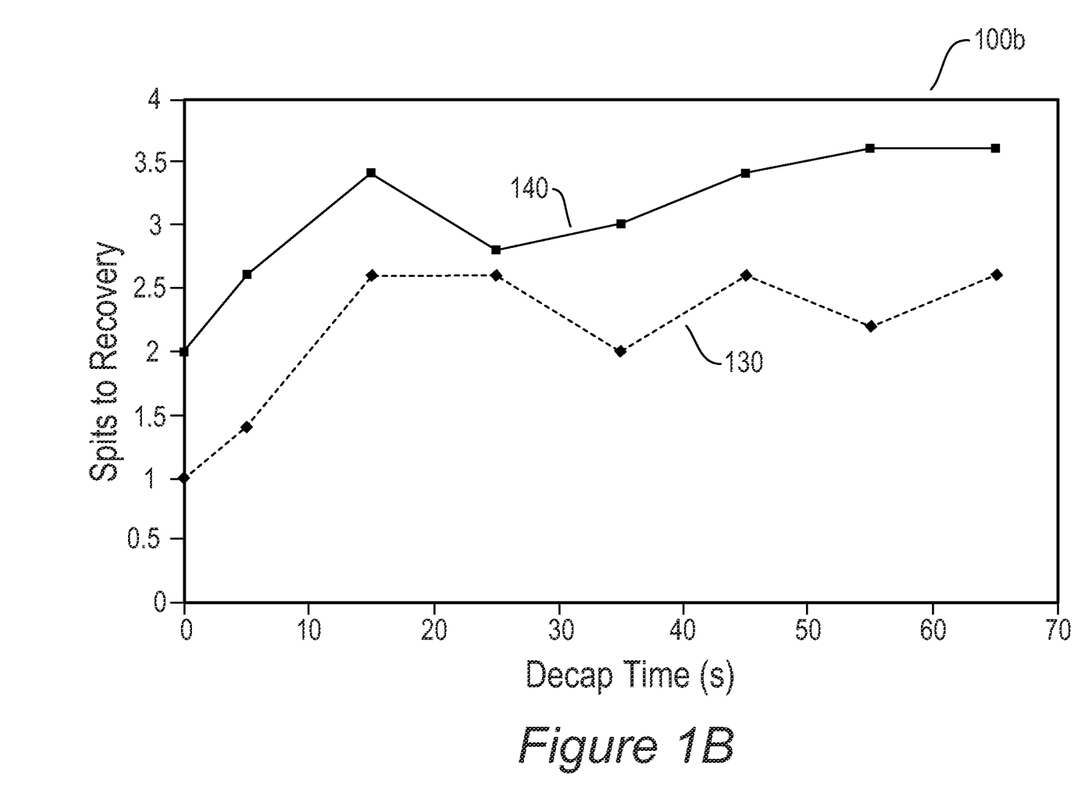
FIG. 1B, on coordinates of spits to recovery and decap time (in seconds), is a graph comparing the recovery of inks including and not including PFPE and using a known effective decapping solvent.

On the other hand, FIG. 1B, on coordinates of spits to recovery and decap time (s), is a graph 100b comparing the recovery of inks including and not including PFPE and using a known effective decapping solvent. The method used to conduct the comparison was substantially the same as described above in the comparison of known ineffective decapping solvents including and not including PFPE. The ink loaded into the cartridges contained the known effective decapping solvent, 2-pyrrolidone (2P) and in one cartridge, the ink further included 0.5% of dicarboxylate terminated PFPE.

In FIG. 1B, the plotline 140 represents the number of spits before recovery by the printhead loaded with ink including 0.5 wt % of dicarboxylate terminated PFPE. On the other hand, the plotline 130 represents the number of spits before recovery by the printhead not including PFPE. As seen in the plotlines 130 and 140, there is no appreciable difference in the speed of recovery of the ink including and not including PFPE when a known effective decapping solvent is used, i.e. the difference in plotlines 130 and 140 may be attributed to the noise of the experiment. Both inks show good decap properties, only needing a minimal number of spits before recovery even after a decap time of greater than 60 seconds. Therefore, the addition of PFPE additives may not negatively impact the good decap properties of inks including effective decapping solvents.

The evaporation rate of an ink may also affect its decap properties. If evaporation of an ink occurs, ink may degrade from the local increase in ink viscosity at the nozzle, the reduced drive bubble strength (i.e. water depletion at the resistor) or some other evaporation driven phenomena, such as phase separation. Therefore, if the evaporation rate of an ink can be suppressed, the decap properties of the ink may be improved. Accordingly, in comparison to inks with higher evaporation rates, inks with lower evaporation rates may be more consistent and may be able to more reliably fire drops of inks after longer periods of decap.

Figure 2:
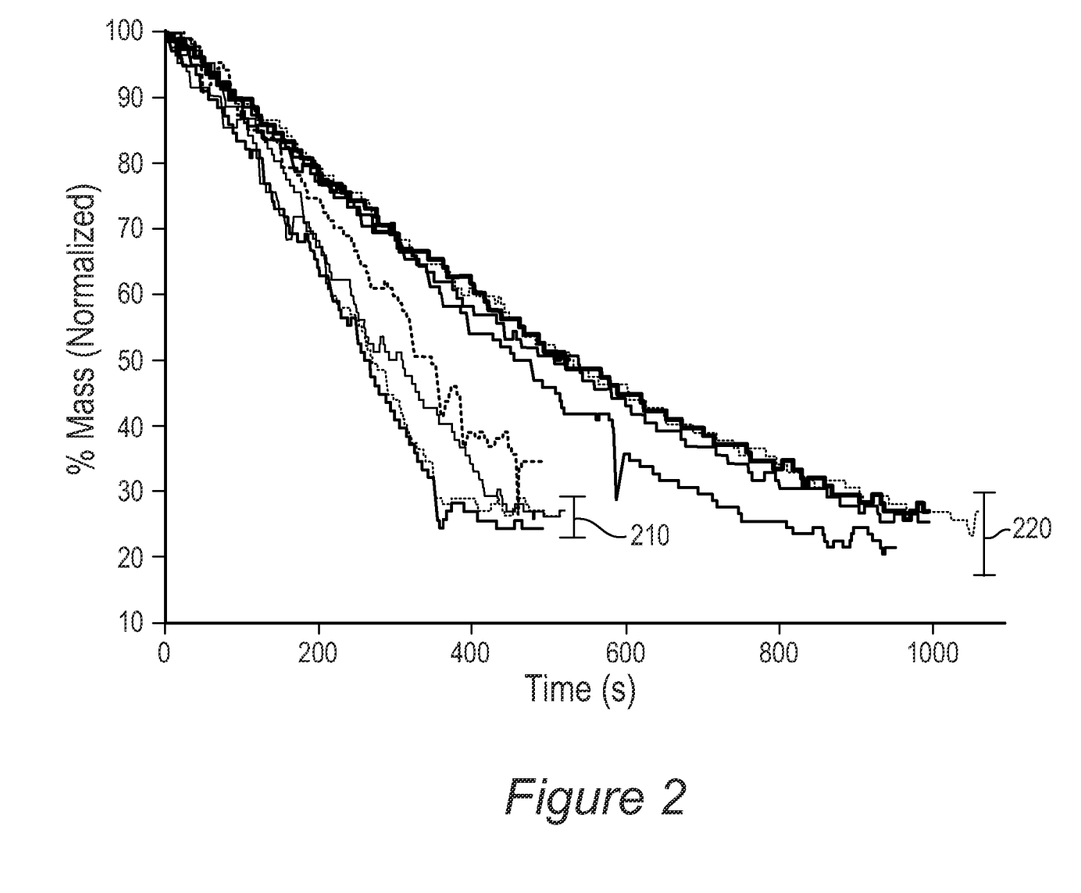
FIG. 2, on coordinates of normalized percent mass and time (in seconds), is a graph comparing the evaporation rate of a drop of ink including and not including PFPE and using a known ineffective decapping solvent.

FIG. 2, on coordinates of normalized percent mass and time (s), is a graph 200 comparing the evaporation rate of a drop of ink including and not including PFPE additives and using an ink vehicle based on the known ineffective decapping solvent, 1,2 hexandiol. In the trials wherein PFPE was included, the ink further included 0.5 wt % dicarboxylate terminated PFPE.

In FIG. 2, the plotlines in group 220 each represent the evaporation rate of a drop of ink including PFPE, while the plotlines in group 210 each represent the evaporation rate of a drop of ink not including PFPE. The evaporation rate is expressed in the percent mass of the drop remaining after a certain elapsed time in an ambient environment. As seen in the plotlines in group 220, the addition of PFPE resulted in an ink drop having a slower and more consistent evaporation rate, indicating, as previously discussed above, a more consistent ink that may have better decap properties.

Therefore, overall, the addition of PFPE additives may serve to improve the decap properties in inks including ineffective decapping solvents and may not negatively impact the good decap properties of inks including effective decapping solvents.

Next, as discussed previously, PFPE additives in inks may also lessen ink puddling during printing and may improve jettablity properties of the ink. When PFPE additives are added to inks including known ineffective decapping solvents, the resulting ink may be fired at a higher drop velocity and a higher level of stability. Table 1 below shows the difference between the average velocity of a fired ink drop including 0.5 wt % of dicarboxylate terminated PFPE and a fired ink drop not including PFPE or any other fluorosurfactant. Both inks further include the ineffective decapping solvent, 1,2, hexanediol.

TABLE 1

|  | Not including PFPE | Including PFPE |
| --- | --- | --- |
| Average drop velocity (m/s) | 9.43 | 15.92 |
| Standard Deviation (m/s) | 6.39 | 0.24 |

As seen in Table 1, ink drops including PFPE additives may be fired at a faster drop velocity than ink drops not including PFPE or other fluorosurfactant additives. Additionally, also as seen in Table 1, the standard deviation of the average drop velocity of ink not including PFPE is much higher than that of ink including PFPE. This higher standard deviation indicates that firing of ink drops not including PFPE may be more erratic and inconsistent, which may result in the quality of the printed images being poor or inconsistent or which may result in puddling on the printhead surface. Accordingly, use of ink including PFPE additives may lead to less puddling on the printhead and more consistent and better quality printed images.

Finally, also as discussed previously, PFPE additives may improve the wetting properties of ink. In ink chemistry, wetting properties describe how an ink makes contact with a substrate, wherein the angle between a drop of ink and the substrate is known as the "contact angle." Inks having high wettability may drop onto a substrate at a contact angle less than 90° and may spread out over a large area of the substrate. Inks having low wettability may drop onto a substrate at a contact angle greater than 90° and may remain compact with minimal spreading on the substrate. Accordingly, inks having high wettability may show puddling on the printhead surface, while inks having low wettability may show less puddling on the printhead surface.

Additionally, inks with low wettability may be effectively used to print on untraditional media, such as less porous media (e.g. plastics) that tends to be nonabsorbent. On such less porous media, inks with low wettability may be able to create higher edge definition through reduced spreading or lower dot gain.

Figure 3:
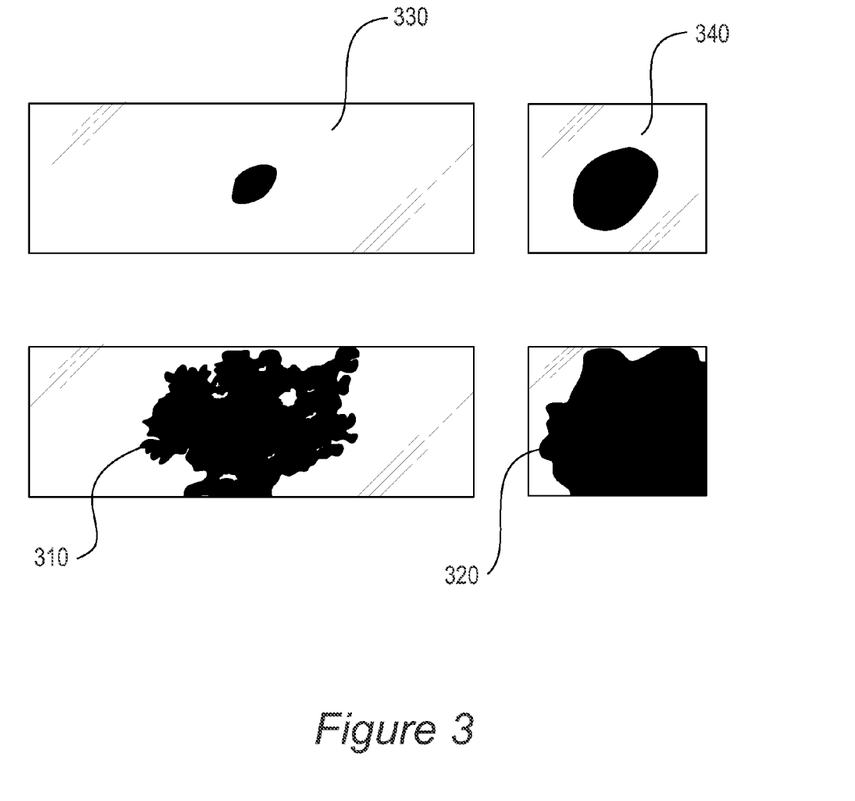
FIG. 3 depicts the wetting behavior of ink including and not including PFPE on organic and inorganic media substrates.

FIG. 3 depicts the wetting behavior of ink including and not including PFPE on organic and inorganic media substrates. In FIG. 3, images 330 and 340 illustrate ink including PFPE dropped onto an inorganic glass substrate and an organic, adhesive-like epoxy substrate, respectively. Images 310 and 320, on the other hand, illustrate ink not including PFPE dropped onto an inorganic glass substrate and an organic adhesive-like epoxy substrate, respectively. The ink used was based on the known ineffective decapping solvent, 1,2-hexanediol. In the trials wherein PFPE was included, the ink further included 0.5 wt % dicarboxylate terminated PFPE. The inorganic substrate used was formed from materials similar to those found in piezo printhead orifices, while the organic substrate used was formed from materials similar to those found in the thermal inkjet printhead orifices and other similar polymer printhead orifices.

As seen in images 310 and 320, when ink not including PFPE is dropped onto inorganic and organic substrates, the contact angle between the ink and the substrate is closer to 0°, indicating ink with high wettability that may puddle during printing. Additionally, when dropped onto a substrate, the ink not including PFPE produces an image with irregular edges and high spread. On the other hand, as seen in images 330 and 340, when ink including PFPE is dropped onto inorganic and organic substrates, the contact angle between the ink and the substrate is closer to 75° indicating ink with low wettability that may not puddle during printing. Also, when dropped onto a substrate, the ink including PFPE produces a compact image with smooth edges. Therefore, inks including PFPEs may have low wettability leading to little puddling on the printhead orifice and may result in higher quality images.

The foregoing inks including a PFPE component may be made using any possible process for formulating aqueous inks. The components of the ink may be added and mixed in any order. In some examples, one or more components are added at the same time and mixed together.

It should be understood that the foregoing inks including a PFPE component have been described with specific application to inkjet inks. However, the use of PFPE components as an additive may find use in other aqueous ink technologies such as water-based UV inks.

What is claimed is:

1. An ink, including:
   an ink vehicle;
   a colorant; and
   a fluorosurfactant, wherein the fluorosurfactant is a polymer having the general formula:

wherein p is an integer, q is an integer, $Z_1$ and $Z_2$ are each fluorine or any functional group, and $R_1$, $R_2$, $R_3$ are each fluorine, any functional group or any alkyl group and wherein $R_1$, $R_2$, $R_3$, $Z_1$, and $Z_2$ are not all fluorine and the fluorosurfactant lowers the surface tension of the ink vehicle.

2. The ink of claim 1 wherein the ratio of p to q is between 1 to 1 and 1 to 2.

3. The ink of claim 1 wherein the inkjet vehicle includes water and a solvent selected from the group consisting of glycerols, glycols, alcohols, diols, amines, ethers, amides, and combinations thereof.

4. The ink of claim 3 wherein the inkjet vehicle includes water and a solvent selected from the group consisting of 1,2-hexanediol, 1,5-pentanediol, 1,3,5-(2-methyl)-pentanetriol, 1,6-hexanediol, 2-methyl-1,3-propanediol, 1,2-alkyldiol, ethylhydroxy-propanediol, 1,2-propanediol, 2-hydroxyethyl-2-pyrrolidone, 2-pyrrolidone, n-methylpyrrolidone, 1-(2-hydroxy ethyl)-2-pyrrolidone, diethylene glycol, dipropylene glycol, propylene glycol, liponic ethylene glycol-1, diethyleneglycol, tetraethylene glycol, n-butyl ether, tri(propyleneglycol) methyl ether, glycerol, n,n-di-(2-hydroxyethyl)-4,4-dimethylhydantoin, 3-pyridyl carbinol, 3 methyl-1-butanol, pentaerythritol, 2-hydroxyethyl-2-imidazole, tetramethylene sulfone, sulfolane, and combinations thereof.

5. The ink of claim 1 wherein the colorant is selected from the group consisting of black dyes, yellow dyes, magenta dyes, red dyes, violet dyes, cyan dyes, blue dyes, green dyes, orange dyes, brown dyes, white dyes, and combinations thereof.

6. The ink of claim 1 wherein the colorant is a colored polymeric particle that has been surface modified to be capable of forming a stable aqueous dispersion.

7. The ink of claim 1 wherein each functional group is selected from the group consisting of acrylates, alcohols, amides, amines, carbamates, carboxylates, epoxies, esters, ethers, guanidiniums, imines, ketones, oximes, phosphates, phosphonates, protonated nitrogens, silanes, sulfates, and sulfonamides.

8. The ink of claim 1 wherein $R_1$, $R_2$, and $R_3$ are all fluorine and wherein $Z_1$ and $Z_2$ are the same or are different but wherein $Z_1$ and $Z_2$ are not both fluorine.

9. The ink of claim 1 wherein either $R_1$, $R_2$ or $R_3$ is an alkyl group further including an additional functional group, wherein the additional functional group is any functional group and wherein the fluorosurfactant lowers the surface tension of the ink vehicle.

10. The ink of claim 9 wherein each functional group is selected from the group consisting of acrylates, alcohols, amides, amines, carbamates, carboxylates, epoxies, esters, ethers, guanidiniums, imines, ketones, oximes, phosphates, phosphonates, protonated nitrogens, silanes, sulfates, and sulfonamides.

11. The ink of claim 9 wherein $Z_1$, $Z_2$, and the additional functional group are the same or at least one of $Z_1$, $Z_2$, and the additional functional group is different.

12. The ink of claim 1 wherein the fluorosurfactant is up to 2 wt % of the ink.

13. The ink of claim 1 further including a component selected from the group consisting of anti-curl agents, buffers, binders, biocides, corrosion inhibitors, dispersants, humectants, light stabilizers, nanoparticle stabilizers, optical brighteners, pH adjusting agents, polymers, rheology modifiers, sequestering agents, stabilizers, surfactants, thickeners, viscosity modifiers, and surface-active agents.

14. A method of improving a property in an ink comprising an ink vehicle and a colorant, the method comprising adding the fluorosurfactant of claim 1 to the ink, wherein the ink vehicle, the colorant, and the fluorosurfactant are added in any order.

15. The method of claim 14 further including adding a component selected from the group consisting of anti-curl agents, buffers, binders, biocides, corrosion inhibitors, dispersants, humectants, light stabilizers, nanoparticle stabilizers, optical brighteners, pH adjusting agents, polymers, rheology modifiers, sequestering agents, stabilizers, surfactants, thickeners, viscosity modifiers, and surface-active agents.

* * * * *

UNITED STATES PATENT AND TRADEMARK OFFICE
CERTIFICATE OF CORRECTION

Page 1 of 1

PATENT NO. : 9,068,096 B2
APPLICATION NO. : 14/232800
DATED : June 30, 2015
INVENTOR(S) : Sterling Chaffins et al.

It is certified that error appears in the above-identified patent and that said Letters Patent is hereby corrected as shown below:

In the Claims

In column 8, line 57, in Claim 4, delete "3 methyl" and insert -- 3-methyl --, therefor.

Signed and Sealed this
Twenty-fourth Day of November, 2015

Michelle K. Lee
*Director of the United States Patent and Trademark Office*